(12) United States Patent
Kuwabara

(10) Patent No.: US 6,201,583 B1
(45) Date of Patent: Mar. 13, 2001

(54) IMAGE SIGNAL INPUT APPARATUS

(75) Inventor: Satoru Kuwabara, Ogaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/086,469

(22) Filed: May 28, 1998

(30) Foreign Application Priority Data

May 29, 1997 (JP) .................................................... 9-140338

(51) Int. Cl.[7] .................................................... H04N 9/78
(52) U.S. Cl. ...................... 348/687; 348/663; 348/552; 348/712; 348/673
(58) Field of Search .................................. 348/687, 688, 348/689, 663, 664, 673, 712, 713, 552, 505, 548, 537, 553, 554; H04N 9/78, 9/77

(56) References Cited

U.S. PATENT DOCUMENTS

| | | | |
|---|---|---|---|
| 4,639,767 | * 1/1987 | Suzuki | 358/21 R |
| 4,689,660 | * 8/1987 | Kashigi | 358/11 |
| 4,870,481 | * 9/1989 | Kawamata | 358/31 |
| 5,311,306 | * 5/1994 | Tanaka et al. | 348/663 |
| 5,325,182 | * 6/1994 | Murata et al. | 348/663 |
| 5,347,321 | * 9/1994 | Gove | 348/663 |
| 5,373,329 | * 12/1994 | Niitsu | 348/669 |
| 5,386,244 | * 1/1995 | Gai | 348/610 |
| 5,416,531 | * 5/1995 | Gai | 348/663 |
| 5,703,660 | * 12/1997 | Hankinson et al. | 348/638 |
| 5,748,260 | * 5/1998 | Hatano | 348/663 |
| 5,815,220 | * 9/1998 | Marshall | 348/663 |
| 5,990,978 | * 11/1999 | Kim et al. | 348/663 |

* cited by examiner

Primary Examiner—John K. Peng
Assistant Examiner—Jean W. Désir
(74) Attorney, Agent, or Firm—Oliff & Berridge, PLC

(57) ABSTRACT

In an image signal input apparatus that performs high-speed input processing of an image signal and, in particular, a brightness signal, a video signal is processed by a clamping circuit so as to achieve a constant reference level, and then input to an A/D converter. The A/D converter samples the video signal synchronously with a clock signal of a frequency 4fsc. The output of the A/D converter is input to a selector directly or via a 4-data arithmetic mean circuit. The 4-data arithmetic mean circuit obtains an arithmetic mean of every four consecutive data output from the A/D converter. The obtained 4-data arithmetic mean data correspond to the brightness signal. After the 4-data arithmetic mean data is stored in a memory through a DMA controller, the data is output to a personal computer via a Centronics® interface, thereby reducing the amount of data memory necessary for input processing to a quarter of the normal amount.

13 Claims, 4 Drawing Sheets

IMAGE SIGNAL INPUT APPARATUS

BACKGROUND OF THE INVENTION

1. Field of Invention

The present invention relates to an image signal input apparatus for inputting to a processing unit an image signal formed by superimposing a brightness signal on a color subcarrier wave having a generally sine waveform.

2. Description of Related Art

Conventional image signals, such as video signals, television signals and the like, are formed by superimposing a brightness signal on a color subcarrier wave that indicates the color of each pixel; the brightness signal varies in strength with the brightness of each pixel. These video signal may be produced by a digital camera. A conventional apparatus for inputting these image signals to a processing unit, such as a computer or the like, converts the image signal into digital data by sampling the image signal at a frequency that is 4 or 8 times the frequency (fsc) of the color subcarrier wave (i.e., a frequency of 4 fsc or 8 fsc). The conventional apparatus then inputs all the data obtained by sampling to the computer or the like.

The data obtained by sampling at a frequency of 4 fsc or 8 fsc can easily be demodulated into an original image signal. Therefore, a processing unit, such as a computer, extracts a brightness signal from the demodulated image signal, performs a preview operation of displaying a corresponding image in a monochrome view and, when a capture key is operated during the preview operation, performs a capture operation of storing in a memory the image signal available at the time of the operation of capture key.

However, the quantity of data obtained by sampling at a frequency of 4 fsc or 8 fsc is large. Therefore, a long processing time is required to input the data to the computer, perform the preview operation based on the data, and optionally perform the capture operation. Therefore, the progression of the preview operation is slower than the progression of the image signal unless the number of frames displayed during preview is considerably reduced. In addition, the displayed monochrome images are displayed after a significant delay time because of the unequal progression of the preview operation and the image signal. Consequently, it is very difficult, if not impossible to precisely input an instruction to perform image signal capture at a desired time by operating a capture key. Further, during processing, operations other than the preview and capture operations are performed on the image signal. Therefore, the problem of a long processing time is compounded. Thus, a reduction in such processing time is needed.

SUMMARY OF THE INVENTION

Accordingly, it is an aspect of the present invention to enable fast input processing of an image signal. Particularly, the present invention provides fast input processing of a brightness signal component of an image signal input to a processing unit which may or may not be a separate unit.

According to the present invention, there is provided an image signal input apparatus for inputting to a processing unit an image signal formed by superimposing a brightness signal on a color subcarrier wave. The processing unit may or may not be separated from the image signal input apparatus. The subcarrier wave has a generally sine waveform. The image signal input apparatus includes a sampling unit that samples the image signal at a predetermined interval and a brightness signal extracting unit that extracts the brightness signal from the image signal based on the image signal obtained by sampling performed by the sampling unit. The image signal input apparatus also includes an input unit which inputs the brightness signal extracted by the brightness signal extracting unit to the processing unit.

In the image signal input apparatus of the invention, an image signal is sampled at a predetermined interval by the sampling unit. The brightness signal extracting unit extracts the brightness signal from the image signal obtained by sampling. The extracted brightness signal is input to the processing unit by the input unit. As a result, the data input to the processing unit does not contain data regarding the color subcarrier wave. Therefore, the quantity of data is reduced. Consequently, it is possible to input only that portion of the image signal relating to the brightness signal to the processing unit. Furthermore, since the image signal input to the processing unit is processed into a state where the brightness signal is already extracted, operation of the processing unit requires less time. Thus, according to the invention, it is possible to quickly process the brightness signal and accurately perform other operations, for example, a preview operation.

The image signal input apparatus of the invention may have the further following features. The color subcarrier wave may be superimposed on the brightness signal using a quadrature two-phase modulation method, an amplitude modulation method or a phase modulation method. Additionally, the sampling unit may sample the image signal at a frequency that is n times the frequency of the color subcarrier wave, where n is a natural number greater than 1. The brightness signal extracting unit may extract the brightness signal by determining a mean of the n number of values of the image signal which are consecutively obtained by sampling performed by the sampling unit.

If values of a sine wave signal at various points in time are sampled at a frequency that is n times the frequency of the sine wave signal, where n is a natural number greater than 2, the mean of the n number of values obtained consecutively by sampling becomes "0". In other words, the mean becomes equal to the value of the oscillation center of the sine wave signal. Since the color subcarrier wave is generally a sine waveform, the locus of the oscillation centers coincides with the brightness signal. Therefore, the brightness signal is extracted by sampling the image signal at a frequency that is n times the frequency of the image signal and determining the mean of the n number of values of the consecutively sampled image signal. Thus, the brightness signal can be extracted from the image signal by a simple operation of obtaining a finite number of sample data and determining a mean thereof. The amount of data to be input to the processing unit is reduced to a fraction of one nth the amount of data that would be input without performing the averaging operation described above. Therefore, these features of the invention achieve the advantage of a further increase in input processing speed of the brightness signal and further improvement of the accuracy and speed of various processing operations.

The natural number n may be 4 or 8. If the sampling of the video signal is performed at a frequency that is 4 times or 8 times the frequency of the color subcarrier wave (fsc), i.e., a frequency of 4 fsc or 8 fsc, the data obtained by sampling can easily be demodulated into the original image signal. This sampling method has been used conventionally.

The image signal input apparatus may include an input unit capable of selectively inputting either the brightness signal extracted by the brightness signal extracting unit or the image signal obtained by sampling by the sampling unit to the processing unit in accordance with a selection instruction.

In this embodiment, the input unit selectively inputs either the brightness signal extracted by the brightness signal extracting unit or the image signal obtained by sampling performed by the sampling unit, to the processing unit in accordance with a selection instruction. Therefore, the input processing of the brightness signal can be performed quickly and the image signal carrying data specifying colors of the pixels can also be input to the processing unit in accordance with the selection instruction. Thus, this embodiment advantageously enables the input of the image signal carrying data regarding colors of the pixels to the processing unit as well. If the sampling is performed at a frequency of 4 fsc or 8 fsc in this embodiment, the demodulation of the sampled image signal into the original image signal may be facilitated so that processing is performed by the processing unit in a more simplified and expedient manner.

This embodiment of the invention may have the following further features. The processing unit may be capable of performing a preview operation which displays an image corresponding to the image signal in a monochrome view. When a capture instruction is input, a capture operation is performed to capture the image signal available at the time that the capture instruction was input. The input unit inputs the brightness signal to the processing unit when the processing unit is performing the preview operation. The input unit also inputs the image signal to the processing unit when the processing unit is performing the capture operation.

These features advantageously enable quick input processing of the brightness signal as described above. Since the input unit inputs the brightness signal to the processing unit when the processing unit is performing the preview operation, the processing related to the preview operation can be performed quickly so that the number of frames displayed during the preview operation increases and delay time is reduced. Therefore, it is possible to input the capture instruction to perform the capture operation at a more precise desired time. The input unit also inputs the image signal to the processing unit when the processing unit is performing the capture operation. Therefore, the image signal carrying data regarding colors can be captured and demodulated efficiently. Consequently, these features advantageously enable the preview operation and the capture operation to be performed more effectively.

BRIEF DESCRIPTION OF THE DRAWINGS

A preferred embodiment of the present invention will be described in detail with reference to the following figures wherein.

DETAILED DESCRIPTION OF PREFERRED EMBODIMENTS

Figure 1:
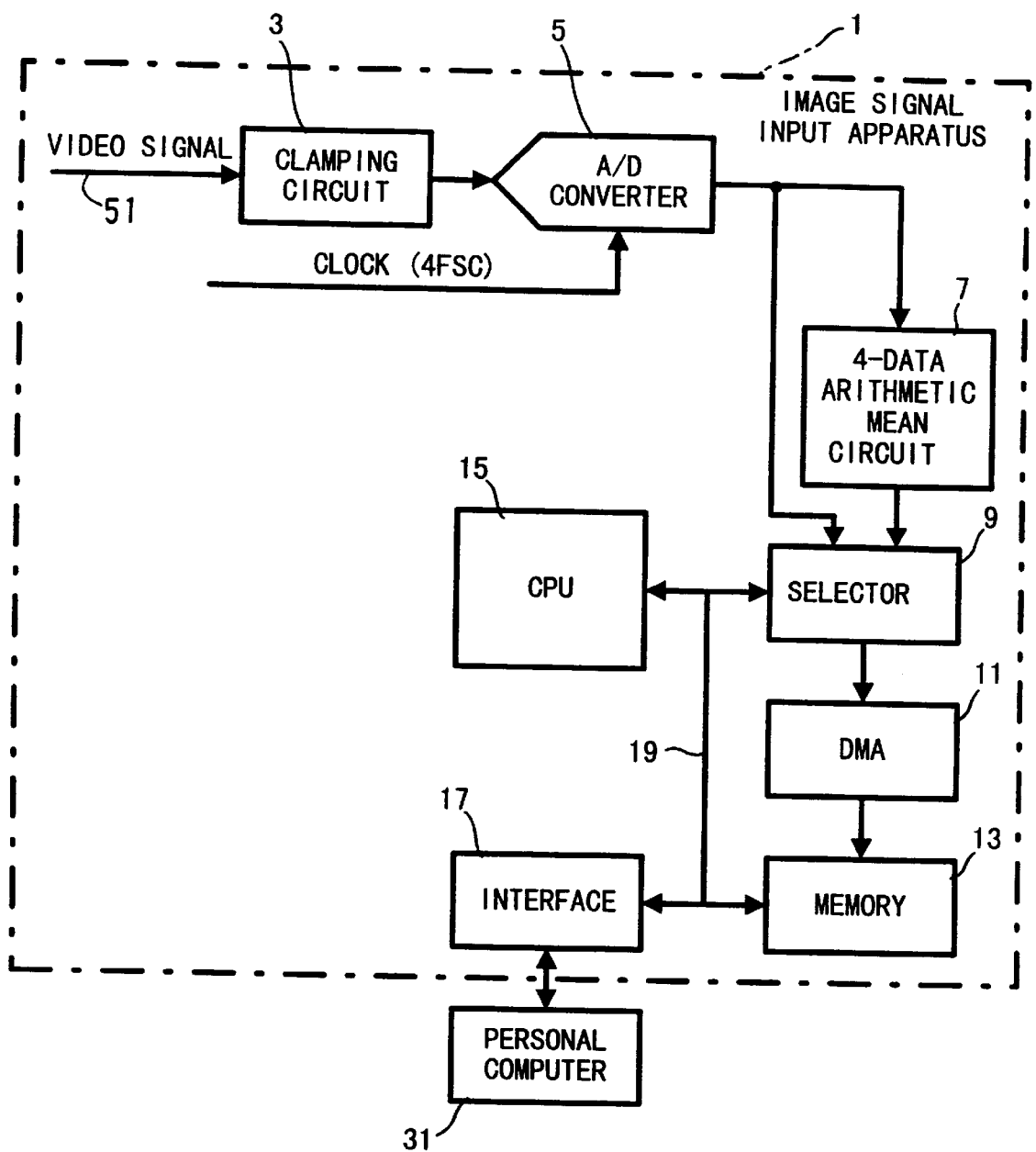
FIG. 1 is a block diagram illustrating an image signal input apparatus according to a preferred embodiment of the invention.

FIG. 1 is a block diagram of an image signal input apparatus 1 according to a first embodiment of the invention.

The image signal input apparatus 1 receives a video signal 51 from a camera and outputs the signal to a personal computer 31, as described below. The camera may be a conventional analog camera or a conventional digital camera as illustrated in FIG. 1. Conventional digital cameras typically include a digital output and an analog output both outputting the same information but in digital and analog form respectively. The preferred embodiments of the invention are explained using an example processing an analog video signal 51; however, the preferred embodiments may be used to process digital video signals as well.

Figure 2:
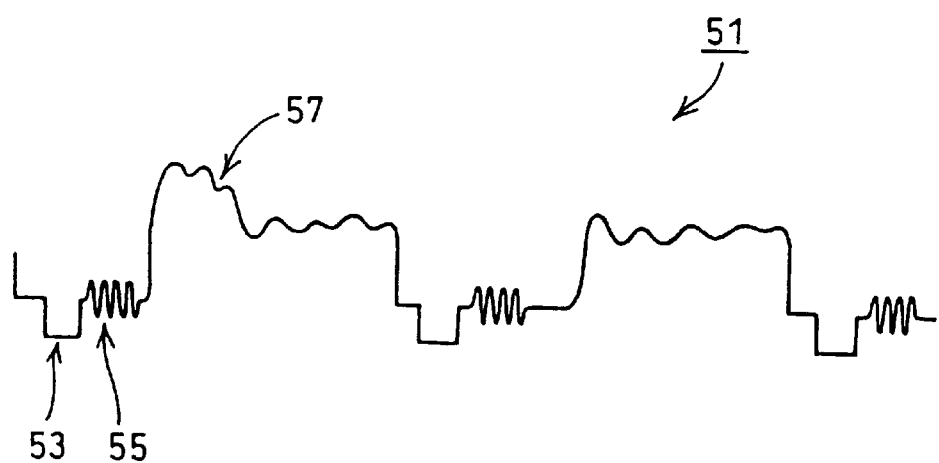
FIG. 2 illustrates an example of the video signal input to the image signal input apparatus shown in FIG. 1.

FIG. 2 illustrates an example of the analog format image video signal 51.

Figure 3:
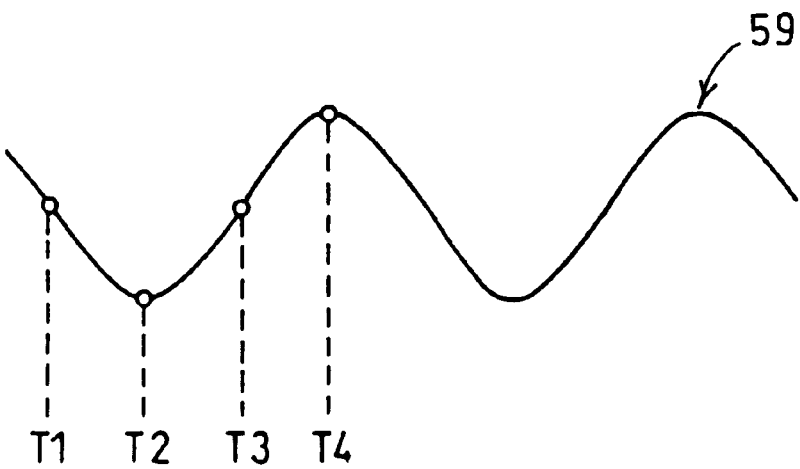
FIG. 3 illustrates a color subcarrier wave of the video signal shown in FIG. 2.

The analog video signal 51 is composed of a horizontal synchronizing signal 53 for aligning the positions of the pixels, a color burst signal 55 for demodulating a chrominance signal, and an image signal 57 indicating the brightness, color and the like of each pixel. The image signal 57 is formed by superimposing a brightness signal, which varies in strength in accordance with the brightness of each pixel, on a color subcarrier wave 59, as shown in FIG. 3, that indicates the color of each pixel. The analog video signal 51 is modulated in accordance with the NTSC system. The color subcarrier wave 59 is modulated using a quadrature two-phase modulation method. Therefore, the color subcarrier wave 59 has phases and amplitudes that correspond to the colors of pixels. The color subcarrier wave 59 forms a sine wave having a constant frequency fsc (=3.579545 MHz) within the wave pattern corresponding to a pixel.

Referring back to FIG. 1, the video signal 51 input to the image signal input apparatus 1 is input to an A/D converter 5 via a clamping circuit 3. Alternatively, if the image signal input apparatus is used to process a digital video signal from a digital video camera, as discussed above, analog to digital conversion by the A/D converter 5 is not necessary. The clamping circuit 3 detects the horizontal synchronizing signal 53 component of the video signal 51 and achieves a constant vertical reference level of the image signal 57. Alternatively, the clamping circuit 3 may detect the color burst signal 55 component of the video signal 51 and achieve a constant vertical reference level of the image signal 57. The A/D converter 5 also receives a clock signal with a frequency of 4 fsc. The A/D converter 5 samples the analog video image signal 57 and outputs the samples as a set of digital full sampled image data each time the A/D converter 5 receives the clock signal.

The sets of digital full sampled image data output from the A/D converter 5 are input to a selector 9 directly or via a 4-data arithmetic mean circuit 7. The 4-data arithmetic mean circuit 7 determines an arithmetic mean of every four consecutive full sampled image data output by the A/D converter 5. The selector 9 selects either the entire full sampled image data output by the AID converter 5 or the 4-data arithmetic mean data provided by the 4-data arithmetic mean circuit 7 and stores the selected data into a memory 13 using a direct memory access (DMA) controller 11. The image signal input apparatus 1 further includes a CPU 15 for performing various operations, and a Centronics® interface 17 for data transmission/reception with a data processing apparatus such as a personal computer 31. The CPU 15, Centronics® interface 17, selector 9 and memory 13 are interconnected by a bus 19 for data transmission/reception therebetween.

The operation of the 4-data arithmetic mean circuit 7 is described below. The color subcarrier wave 59 forms a sine wave with a frequency fsc within a portion of the color subcarrier wave 59 corresponding to each pixel as shown in FIG. 3. By sampling the sine wave at times T1, T2, T3 and T4 which is synchronous with a 4fsc clock signal, signal strengths at points 90° out of phase are obtained. The arithmetic mean of four consecutive samples of full sampled image data equals the value of the oscillation center of the color subcarrier wave 59. Therefore, the 4-data arithmetic mean data input to the selector 9 by the 4-data arithmetic mean circuit 7 corresponds to the brightness signal in a form where the brightness signal is not superimposed on the color subcarrier wave 59 to form the image signal 57. Therefore, by controlling the selection by the selector 9, the CPU 15 extracts the brightness signal when necessary.

Figure 4:
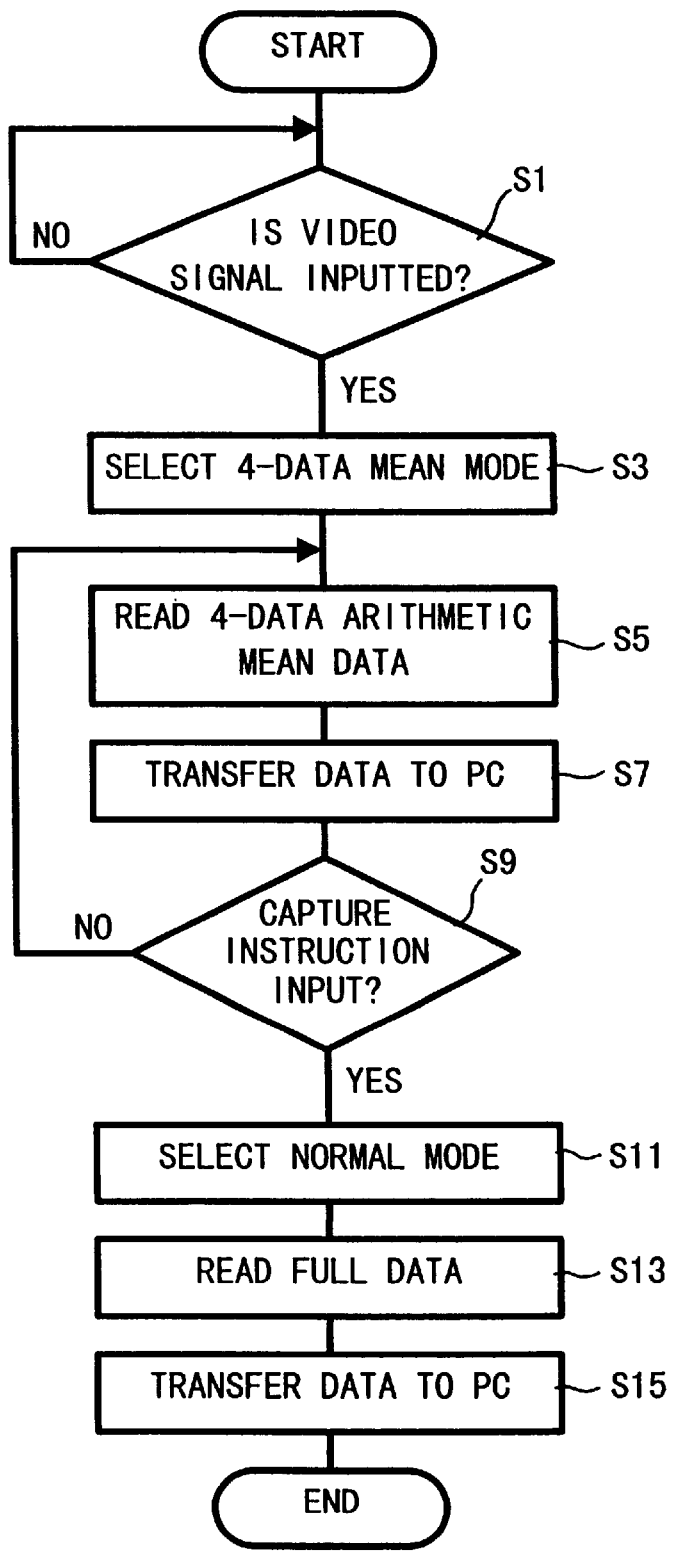
FIG. 4 is a flowchart illustrating an operation of the image signal input apparatus shown in FIG. 1.

The operation performed by the CPU IS will be described with reference to the flowchart shown in FIG. 4. The CPU 15 performs the operation based on a program stored in a ROM (not shown), when the image signal input apparatus 1 is powered on.

When the operation is started, in step S1, it is first determined whether the video signal 51 is received. If the video signal 51 is not received (NO in step S1), the CPU 15 waits at step S1 until the video signal is received. If the video signal 51 is received (YES in step S1), the CPU 15 proceeds to step S3.

Meanwhile, the A/D converter 5 converts the analog image signal 51 to produce the fill sampled image data. In step S3, the CPU 15 selects a 4-data mean mode as a control mode for the selector 9 during which the 4-data arithmetic mean circuit 7 produces 4-data arithmetic mean data and inputs the 4-data arithmetic mean data into the selector 9 and proceeds to step S5. Meanwhile, the 4-data arithmetic mean data input to the selector 9 is written in the memory 13 through the DMA controller 11.

Subsequently, the CPU 15 reads the 4-data arithmetic mean data from the memory 13 in step S5 and transfers (inputs) the 4-data arithmetic mean data to the personal computer 31 in step S7. The 4-data arithmetic mean data corresponds to the brightness signal as mentioned above. Therefore, based on the 4-data arithmetic mean data, the personal computer 31 performs a preview operation of displaying a monochrome view image corresponding to the video signal 51.

Subsequently, in step S9, the CPU 15 reads the operating state of the personal computer 31, and determines whether a capture key is operated to input a capture instruction. If no capture instruction is input (NO in step S9), steps S5 and S7 are repeated to continue transferring the 4-data arithmetic mean data to the personal computer 31. While the 4-data arithmetic mean data is being transferred, the personal computer 31 continues the preview operation, displaying monochrome view images by frame-by-frame advance in accordance with the progress of the video signal 51.

When the capture instruction is input (YES in step S9), the operation proceeds to step S11, when the CPU 15 selects a normal mode as a control mode for the selector 9. Meanwhile, the full sampled image data produced by the A/D converter 5 is input to the selector 9 and written in the memory 13 through the DMA controller 11. Subsequently, the full sampled image data stored in the memory 13 are read in step S13 and transferred to the personal computer 31 in step S15. The operation is then temporarily ended.

With the full sampled image data transferred, the personal computer 31 performs a capture operation of capturing the full sampled image data. Since the full sampled image data is obtained by sampling at a frequency of 4 fsc, the full sampled image data can easily be demodulated into the original video signal 51. Therefore, the personal computer 31 demodulates the full sampled image data captured during the capture operation, into the original video signal 51. Subsequently, the personal computer 31 uses the signal in various processes such as image forming processing by a printer (not shown).

As understood from the above description, the image signal input apparatus 1 is able to selectively operate either the 4-data mean data mode or the normal mode. In the 4-data mean data mode, the 4-data arithmetic mean data corresponding to the brightness signal are extracted by arithmetically averaging the data obtained by sampling at the frequency of 4 fsc and the 4-data arithmetic mean data is then transferred to the personal computer 31. In the normal mode, the full sampled image data (i.e., the full sampled image data including data regarding colors) are transferred to the personal computer 31 by operation of the switching the modes of the selector 9.

When the personal computer 31 is performing the preview operation, the image signal input apparatus 1 selects the 4-data mean mode so that the amount of data transferred to the personal computer 31 is reduced to a quarter of the amount of data transferred in the normal mode. As a result, input processing speed is improved. The data transferred to the personal computer 31 is processed by the image signal input apparatus 1 into a state where the brightness signal is already extracted. Therefore, the data input to the personal computer 31 immediately correspond to monochrome images so that the operations necessarily performed by the personal computer 31 during the preview operation can be minimized. Therefore, since the image signal input apparatus 1 performs the preview operation more quickly, the number of frames displayed during the preview operation can be increased and, at the same time, the delay time between the image signal input and display of the corresponding monochrome view image can be reduced. Consequently, input of the capture instruction for execution of the capture operation can be performed precisely at a desired timing.

When the personal computer 31 is performing the capture operation, the image signal input apparatus 1 selects the normal mode and thereby transfers full sampled image data to the personal computer 31. Since the full sampled image data is obtained by sampling at the frequency 4 fsc, the demodulation into the video signal 51 can be performed very easily. Therefore, the personal computer 31 can perform various processes, such as image formation more efficiently.

In this embodiment, the AID converter 5 constitutes a sampling unit, the 4-data arithmetic mean circuit 7 constitutes a brightness signal extracting unit, the Centronics® interface 17 and the CPU 15 constitute an input unit and the personal computer 31 constitutes a processing unit. It should be apparent that the invention is not limited to the foregoing embodiment in any manner. The invention may be carried out in various forms without departing from the scope of the invention.

For example, although the foregoing embodiment samples an analog video signal 51 at a frequency of 4 fsc, alternatively, the sampling may be performed at any frequency which is a multiple of fsc (i.e., of nfsc, where n is a natural number greater than 1). If the analog video signal 51 is formed by superimposing the brightness signal on the color subcarrier wave 59 by a quadrature two-phase modulation method, an amplitude modulation method or a phase modulation method, the brightness signal can be extracted substantially in the same manner as in the foregoing embodiment. That is, the brightness signal can be extracted by arithmetically averaging the n number of consecutively sampled data sampled at a frequency of nfsc (arithmetic mean). Thus, this sampling of the analog video signal 51 makes it possible to perform the brightness signal input processing at a faster rate. However, it should be noted that if the sampling of the analog video signal is performed at a frequency of 4 fsc or 8 fsc, demodulation of the full sampled image data input personal computer 31 is easy so the operation performed by the personal computer 31 is simplified and processing speed is improved. Sampling at 4 fsc or 8 fsc also facilitates easier application of the invention since it requires relatively small improvements to a conventional apparatus.

Further, the invention is applicable to any apparatus for inputting to a processing unit a so-called composite signal, such as a television signal, video signal and the like. It is also possible to integrate an image signal input apparatus according to the invention with a processing unit such as a computer or the like, into a single unit. The invention may also be applied to processing, other than the preview operation and the capture operation, that is performed by a computer or the like on the full sampled image signal input by an image signal input apparatus according to the invention.

It is to be understood that the invention is not restricted to the particular forms shown in the foregoing embodiment or any disclosed construction. Various other modifications and alternations can be made thereto without departing from the scope of the invention.

What is claimed is:

1. An image signal input apparatus for inputting to a processing unit an image signal formed by superimposing a brightness signal on a color subcarrier wave having a generally sine waveform, the apparatus comprising:

a brightness signal extracting unit that extracts the brightness signal from the image signal, an output unit that outputs the extracted brightness signal to the processing unit, and a sampling unit that samples the image signal at a sampling frequency to produce a sampled image signal, wherein the brightness signal extracting unit extracts the brightness signal from the image signal based on the sampled image signal and the brightness signal is superimposed on the color subcarrier wave using a quadrature two-phase modulation method, an amplitude modulation method or a phase modulation method;

the sampling unit samples the image signal at the sampling frequency that is a multiple of a frequency of the color subcarrier wave; and the brightness signal extraction unit extracts the brightness signal by determining a mean value of the sampled image signal.

2. An image signal input apparatus according to claim 1, wherein the sampling frequency, which is a multiple of the frequency of the color subcarrier wave, is n times the frequency of the color subcarrier wave, where n is a natural number greater than 1, and the brightness signal extracting unit determines the mean value of the sampled data by determining the mean value of n number of values of the sampled image signal which are consecutively sampled by the sampling unit.

3. An image signal input apparatus according to claim 2, wherein the natural number n is 4 or 8.

4. An image signal input apparatus for inputting to a processing unit an image signal formed by superimposing a brightness signal on a color subcarrier wave having a generally sine waveform, the apparatus comprising:

a brightness signal extracting unit that extracts the brightness signal from the image signal, an output unit that outputs the extracted brightness signal to the processing unit, and a sampling unit that samples the image signal at a sampling frequency to produce a sampled image signal, wherein the brightness signal extracting unit extracts the brightness signal from the image signal based on the sampled image signal and the output unit is capable of selectively outputting one of the extracted brightness signal and the sampled image signal to the processing unit in accordance with a selection instruction.

5. An image signal input apparatus according to claim 4, wherein the output unit outputs the extracted brightness signal to the processing unit when the processing unit is performing a preview operation and outputs the sampled image signal to the processing unit when the processing unit is performing a capture operation.

6. An image signal input apparatus according to claim 4, in combination with the processing unit for processing image signals, wherein the output unit outputs the extracted brightness signal to the processing unit when the processing unit is performing a preview operation and outputs the sampled image signal to the processing unit when the processing unit is performing a capture operation.

7. An image signal input apparatus according to claim 6, wherein the processing unit receives the extracted brightness signal and performs a preview operation of displaying an image in a monochrome view based on the extracted brightness signal, and, when a capture instruction is input, the processing unit performs a capture operation of capturing the sampled image signal available at the time of input of the capture instruction.

8. An image signal input apparatus according to claim 6, wherein the brightness signal is superimposed on the color subcarrier wave using a quadrature two-phase modulation method, an amplitude modulation method or a phase modulation method, and the sampling frequency is a multiple of a frequency of the color subcarrier wave, and the brightness signal extracting unit extracts the brightness signal by determining a mean value of the sampled image signal.

9. An image signal input apparatus according to claim 6, wherein the sampling frequency, which is a multiple of the frequency of the color subcarrier wave, is n times the frequency of the color subcarrier wave, where n is a natural number greater than 1, and the brightness signal extracting unit determines the mean value of the sampled image signal by determining the mean value of n number of values of the sampled image signal which are consecutively sampled by the sampling unit.

10. An image signal input apparatus according to claim 9, wherein the natural number n is 4 or 8.

11. A method for processing an image signal formed by superimposing a brightness signal on a color subcarrier wave having a generally sine waveform, the method comprising:

extracting a brightness signal from the image signal outputting the extracted brightness signal;

receiving the extracted brightness signal and samples of the image signal in a processing unit;

performing a preview operation of displaying an image in a monochrome view based on the extracted brightness signal; and when a capture instruction is input, performing a capture operation of capturing the samples of the image signal received in the processing unit and available at the time of input of the capture instruction.

12. A method for processing an image signal formed by superimposing a brightness signal on a color subcarrier wave having a generally sine waveform, the method comprising:

extracting a brightness signal from the image signal;

outputting the extracted brightness signal;

sampling the image signal at a sampling frequency to produce a sampled image signal, wherein the brightness signal is extracted from the sampled image signal based on the sampled signal;

receiving the sampled image signal and the extracted brightness signal in a processing unit;

performing a preview operation of displaying an image in a monochrome view based on the extracted brightness signal; and when a capture instruction is input, performing a capture operation of capturing the samples of the image signal received in the processing unit and available at the time of input of the capture instruction.

13. An image signal input apparatus for processing an image signal formed by superimposing a brightness signal on a color subcarrier wave having a generally sine waveform, the apparatus comprising:

means for extracting a brightness signal from the image signal;

means for outputting the extracted brightness signal;

means for sampling the image signal at a sampling frequency to produce a sampled image signal wherein the means for extracting a brightness signal from the image signal extracts the brightness signal based on the sampled image signal;

means for receiving the image signal and the extracted brightness signal in a processing unit;

means for performing a preview operation of displaying an image in monochrome view based on the extracted brightness signal; and means for performing a capture operation of capturing the samples of the image signal available at an input time of the capture instruction.

\* \* \* \* \*